No. 715,658. Patented Dec. 9, 1902.
F. G. HAMPSON & H. SWALES.
AERATION OF LIQUIDS.
(Application filed July 3, 1901.)
(No Model.) 9 Sheets—Sheet 3.

No. 715,658. Patented Dec. 9, 1902.
F. G. HAMPSON & H. SWALES.
AERATION OF LIQUIDS.
(Application filed July 2, 1901.)
(No Model.) 9 Sheets—Sheet 4.

No. 715,658. Patented Dec. 9, 1902.
F. G. HAMPSON & H. SWALES.
AERATION OF LIQUIDS.
(Application filed July 3, 1901.)

(No Model.) 9 Sheets—Sheet 5.

Fig. 7.

No. 715,658. Patented Dec. 9, 1902.
F. G. HAMPSON & H. SWALES.
AERATION OF LIQUIDS.
(Application filed July 3, 1901.)

(No Model.) 9 Sheets—Sheet 6.

No. 715,658. Patented Dec. 9, 1902.
F. G. HAMPSON & H. SWALES.
AERATION OF LIQUIDS.
(Application filed July 3, 1901.)
(No Model.) 9 Sheets—Sheet 7.

No. 715,658. Patented Dec. 9, 1902.
F. G. HAMPSON & H. SWALES.
AERATION OF LIQUIDS.
Application filed July 3, 1901.

(No Model.) 9 Sheets—Sheet 9.

UNITED STATES PATENT OFFICE.

FRANK GEORGE HAMPSON, OF CLAPHAM, AND HARRY SWALES, OF LONDON, ENGLAND.

AERATION OF LIQUIDS.

SPECIFICATION forming part of Letters Patent No. 715,658, dated December 9, 1902.

Application filed July 3, 1901. Serial No. 67,035. (No model.)

*To all whom it may concern:*

Be it known that we, FRANK GEORGE HAMPSON, residing at Clapham, county of Surrey, and HARRY SWALES, residing at London, England, subjects of the King of England, have invented certain new and useful Improvements in or Relating to the Aeration of Liquids, (for which we have made application for Letters Patent in Great Britain under No. 9,287, dated May 4, 1901; No. 10,166, dated May 16, 1901; No. 10,798, dated May 25, 1901, and No. 11,612, dated June 6, 1901,) of which the following is a specification.

This invention relates to the aerating of liquids, and has for its chief object to construct an apparatus which can be utilized with an ordinary liquid and gas supply.

According to this invention the liquid and gas are supplied from separate sources, the gas preferably being supplied under pressure from a chamber or container and the liquid from one or more reservoirs or other convenient sources of supply. The gas-chamber and liquid-reservoirs are placed in communication with an apparatus which when manipulated in a suitable manner will cause a mixing receptacle or chamber to be filled with the liquid and the latter to be aerated by the gas, the aerated product being delivered from the receptacle as required.

According to one form the above-mentioned apparatus is so constructed that the receptacle is normally empty, but can be filled by rotating or otherwise operating a handle-spindle or similar contrivance, whereby gas and liquid are admitted to the receptacle, the supply being automatically cut off and the aerated liquid delivered when the receptacle is full or when the internal pressure reaches a predetermined limit. According to another arrangement the receptacle is normally full of aerated liquid, in which case the liquid may be discharged by the operation of a handle or spindle, as above mentioned, or the aerated liquid may be discharged by rotating or otherwise moving a handle or spindle in one direction, the reverse movement of the spindle closing the discharge-outlet and admitting to the chamber a fresh supply of liquid or gas.

Referring to the drawings, Fig. 12 is a sectional elevation of a further modification of valve-operating mechanism. Fig. 13 is a sectional elevation of the pressure-indicating device, and Fig. 14 a sectional elevation of the pressure-reducing valve for the supply-pipes.

Figure 1:
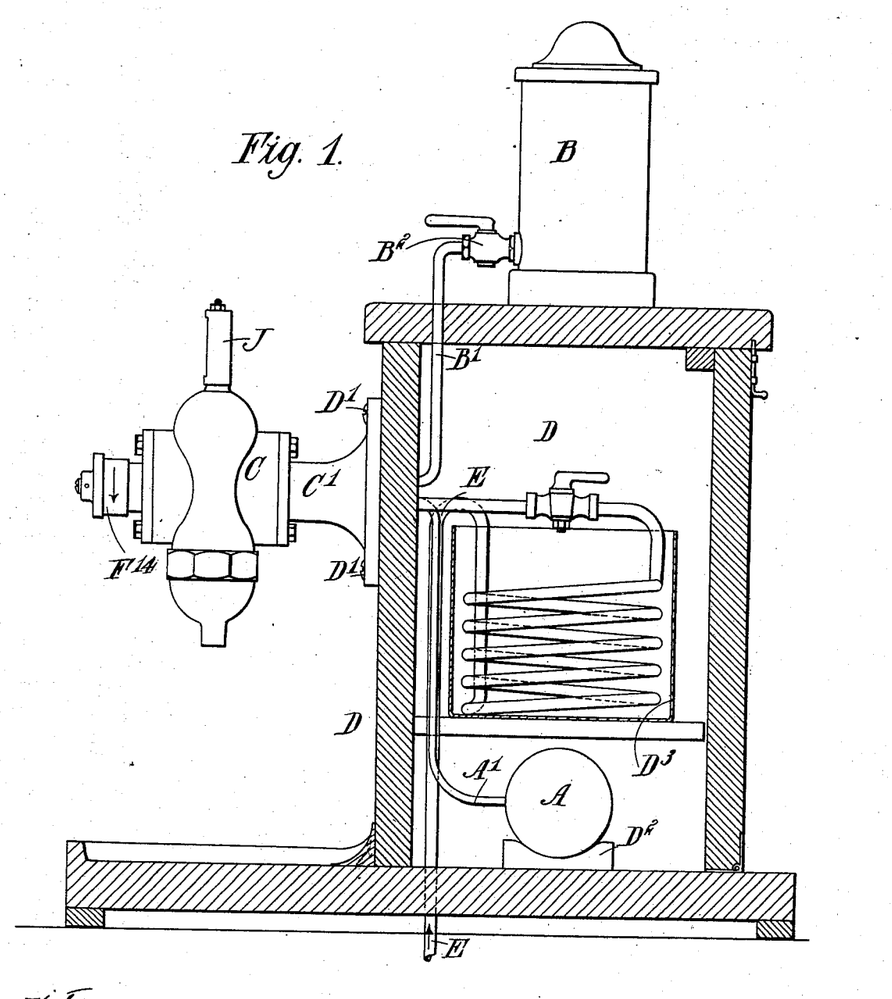
Figure 1 is a sectional elevation, and Fig. 2 a front elevation, of an installation for supplying aerated liquid in accordance with our invention.
Figure 2:
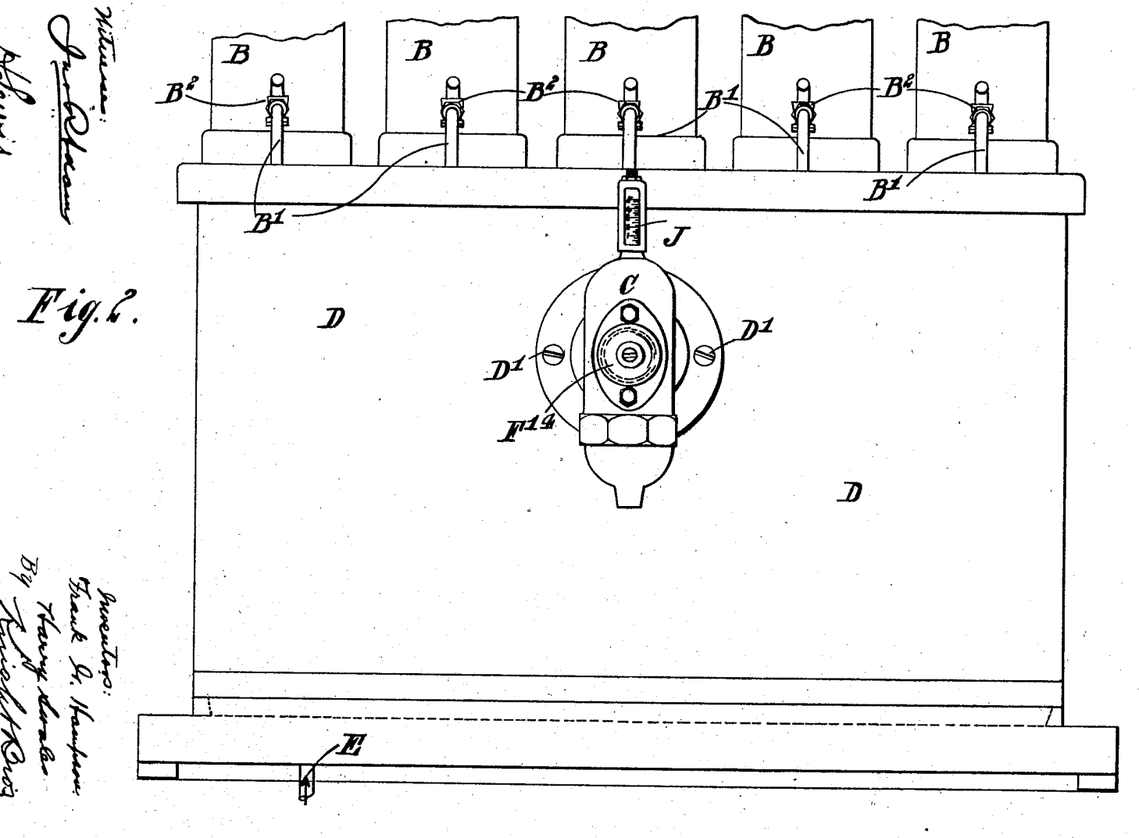

A is the gas-receptacle.

B represents reservoirs for liquid to be aerated.

C is a mixing or aerating chamber or receptacle.

D is the casing, and E the water-supply pipe.

The aerating-receptacle C is mounted upon one side of the casing D, to which it is connected by screws D'. The reservoirs containing the liquid to be aerated are mounted on the top of the said casing, the gas-receptacle A being carried on suitable supports $D^2$ within the casing. The water is supplied to the receptacle by the pipe E either direct from the main or from any other suitable source of supply. Within the casing D is an ice-box or cooling-chamber $D^3$, in which the water-pipe E is coiled, and, if desired, the pipes connected with the reservoirs B may also be led through this cooling-box.

Figure 3:
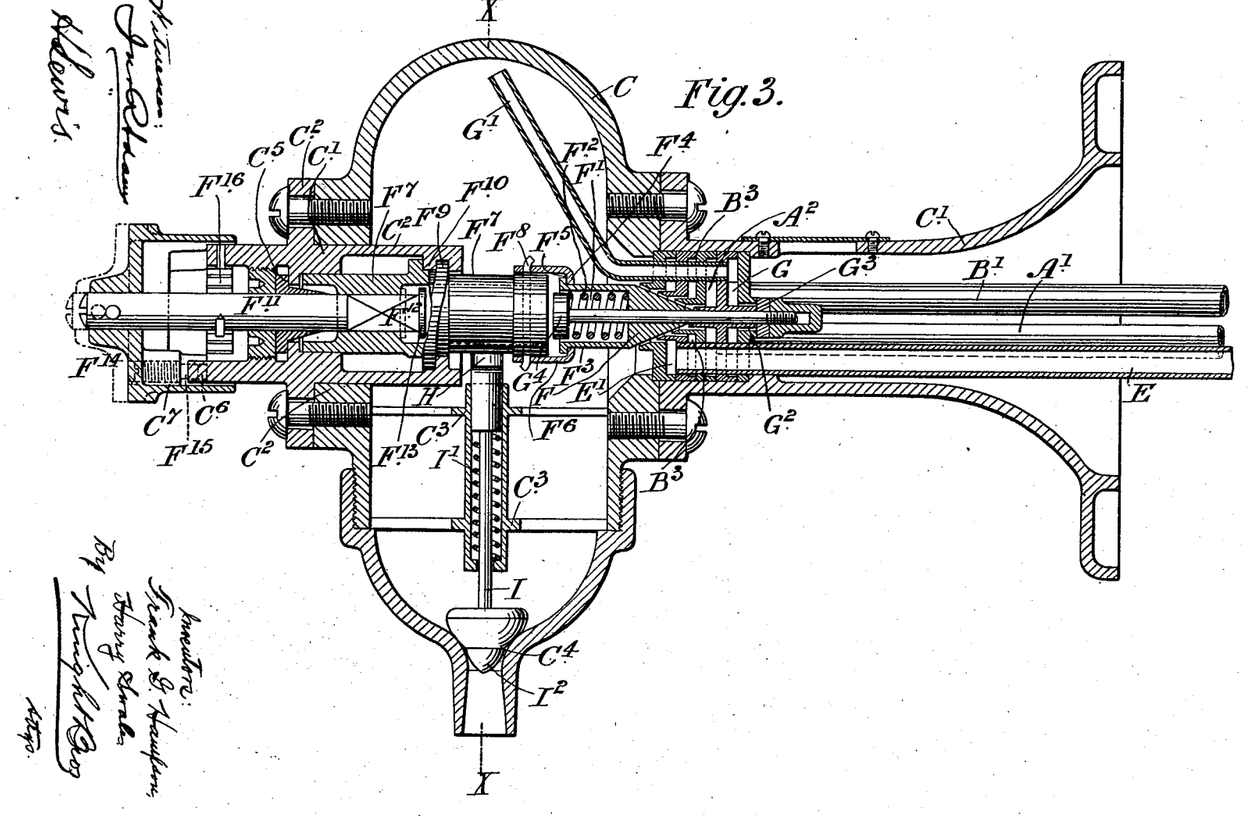
Fig. 3 is a sectional elevation of one form of the aerating-chamber and parts connected therewith, the chamber being normally empty.

The water-pipe E, the gas-pipe A', and the pipes B', leading from the reservoirs B, pass through an opening in the wall D' of the casing and, as shown in Fig. 3, along the hollow support C' of the receptacle C. The apparatus illustrated in Fig. 3 is so arranged that the receptacle C is normally empty.

The water-pipe E opens into a chamber E', the gas-pipe A' into a chamber A², and the pipes B' into a chamber B³. These chambers E', A², and B³ are disposed coaxially and are preferably formed by arranging a series of disks, each having a peripheral flange on one side and a central apertured hub projecting on the other side. These disks are disposed one against the other within the hollow extension or support C' and so that the hub of one disk projects into the aperture of the hub of the next succeeding disk, the apertures being so regulated as to leave an annular space between the outer wall of one hub and the inner wall of the succeeding hub. Each chamber has an annular orifice or delivery-passage extending through the hub-aperture, whereby they communicate with the receptacle C in such a way that all the orifices may be simultaneously controlled by the conical valve F.

An additional chamber G, arranged coaxially with the other chambers, is not provided with an outlet-orifice controlled by the valve F, but communicates with the aerating-receptacle by means of a pipe G' and with the atmosphere through openings G², which are controlled by a valve G³. The spindle of the valve G³ extends through an opening in the conical valve F and is provided at its inner end with a piston or enlarged head G⁴, adapted to slide in a chamber F' on the valve. The spring F² is situated between the enlarged head G⁴ and the end of the chamber and retains the valve G³ against the openings G² and tending also to force the valve F against the opening at the inner ends of the several hubs. The valve G³ serves to allow of the pressure in the chamber C to be reduced before the aerated liquid is delivered, as will be hereinafter described.

The chamber into which the coaxial delivery-passages open and wherein the liquid and gas mingle and from which the aerated liquid is delivered is preferably formed of metal and in such a manner that ready access may be had to its interior for cleansing and other purposes, and it may be of any suitable shape, size, and construction.

The mechanism for controlling the supply of liquid and gas, the reduction of pressure in the receptacle, and the delivery of the aerated liquid comprises the conical valve F and the valve G³. The cylindrical part F³ of the valve F is provided with an outwardly-extending flange F⁵, which engages with an inwardly-extending flange F⁴ on a sleeve F⁶, connected to the rotatable member F⁷ by a pin F⁸ or in any other suitable manner. The flanges are so arranged as to allow the valve F to be moved onto or off its seat without being rotated with the member F⁷. In the construction shown in Fig. 3 on the end of the rotatable member F⁷ is formed a left-handed screw-thread F⁹, which engages with a corresponding screw-thread F¹⁰ on the part C² of the casing, which extends for some distance into the aerating-receptacle. The body of the rotatable member F⁷ is cut away in part to form a cam-surface (see Figs. 4, 5, and 6) adapted to bear against a projection H on the end of the rod I of the delivery-valve I², which slides in a guide-tube C³ and is controlled in one direction by a spring I', placed between the end of the tube and the enlarged head of the valve-stem. The cam-surface normally when rotated presses against its seat on the outlet-orifice C⁴, and the spring I' tends to raise the valve off its seat to open this orifice.

The screw-thread is preferably left-handed, so that the motion to move the valve F off its seat is a right-handed one.

C⁵ is a stuffing-gland to prevent the liquid in the aerating-chamber from escaping between the valve-operating spindle F¹¹ and its casing. The end of the rotatable member F⁷ in which the spindle is mounted is provided internally with a longitudinal square or similar hole, into which loosely fits the similarly-shaped end portion F¹² of the valve-spindle, so that the latter rotates with the member F⁷, but is capable of independent longitudinal or axial movement. On the outer end the spindle has attached to it a cap-shaped head F¹⁴, which is provided with a stud F¹⁵, so arranged that when the cap and spindle are turned sufficiently to open the supply-valve the necessary amount it will run up an inclined surface C⁶ of the casing C² and thereafter engage with the recess in the cam-surface. The spindle has connected to it one end of a coiled spring F¹⁶, the other end of which is attached to the casing, the arrangement being such that the spring tends to return the spindle to its normal position, in which the valve F is firmly on its seat.

Figure 4:
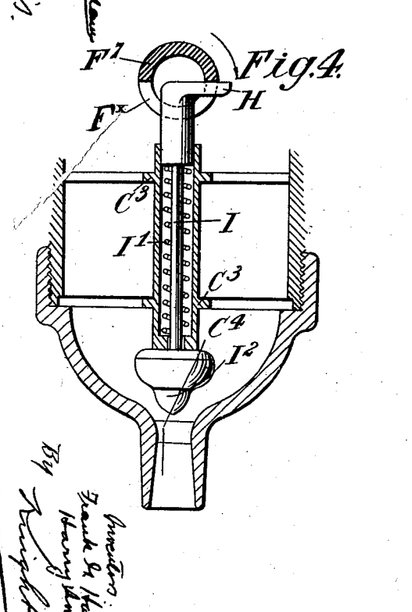
Figs. 4, 5, and 6 are transverse sections on the line $x\ x$ of Fig. 3 of the means for operating the discharge-valve.
Figure 5:
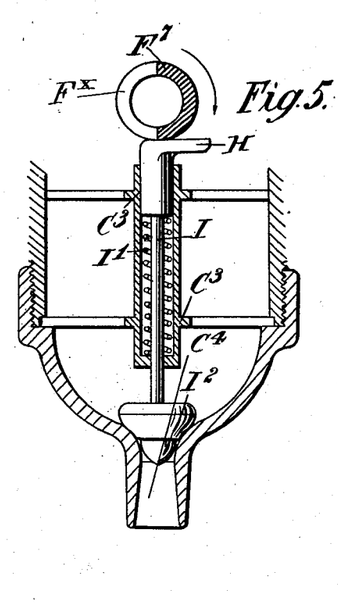
Figure 6:
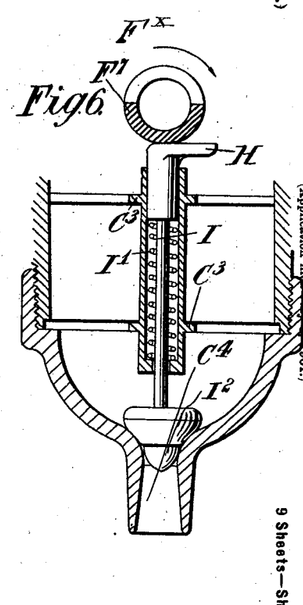

In the normal or general condition of the apparatus the conical inlet-valve F is on its seat, so as to close the inlet-orifices, the pressure-reducing valve G³ being held open by the end of the rotatable member F⁷, while the outlet-valve C⁴ is also open, as shown in Fig. 4. When it is desired to use the apparatus, the cylinder F¹⁴ is turned to the right to rotate the spindle, and with it the member F⁷. The rotatable member moves axially under the influence of the screw-threads F⁹ and F¹⁰, and the spindle F¹¹ moves axially independent of the member F⁷ under the action of the incline C⁶. After the spindle has moved through a quarter-turn the pressure-reducing valve is closed by the spring F², the inlet-orifices are just about to be opened, and the discharge-valve is closed, as shown in Fig. 5. On rotating the spindle for another quarter-turn the pin F¹⁵ snaps into the recess C⁷ and the discharge-valve is still kept closed by the member F⁷, which is now in the position shown in Fig. 6. The inlet-orifice is now fully open, while the pressure-reducing valve is drawn still farther on its seat by the spring consequent on the relative movement of the part F³ and the slide G⁴ of the valve-spindle.

The liquid in the receptacle C has access to the inner end of the valve-operating spindle in the interior of the rotatable member $F^7$ through the opening $F^X$, formed in the walls of the member by cutting away a part thereof, and when the receptacle is filled or when the pressure therein has reached a predetermined limit this pressure acts on the flange $F^{13}$ on the end of the valve-operating spindle, moving the spindle axially outward, and thereby releases the pin $F^{15}$ from engagement with the recess $C^7$, as shown in dotted lines in Fig. 3. By this movement the spindle is caused to rotate and return to its normal position under the action of the spring $F^{16}$, thereby returning the valve F to its seat and cutting off further supply of liquid and gas to the receptacle. This action brings the cam on the rotatable member $F^7$ out of engagement with the end H of the discharge-valve rod I, so that this valve is opened by the spring I' and aerated liquid delivered from the chamber.

Just previous to the discharge of the liquid through the orifice $C^4$ and when the valve F has returned to its seat under the action of the spring $F^2$ or by the end of the member $F^7$ bearing against the flange $F^5$ to press the valve onto its seat the pressure of the liquid within the receptacle, acting on the end $G^4$ of the stem of the valve $G^3$, forces it off its seat, thereby allowing the excess gas from the receptacle to pass by the pipe $G^3$, chamber G, and the openings $G^2$ to the atmosphere, so that the pressure in the receptacle is reduced before the liquid is delivered. The reason for the pressure not operating this pressure-reducing valve previously is that when the spindle is rotated by hand to move the member $F^7$ and lift the valve F off its seat the spring $F^2$ is contracted; but when the pressure acting on the flange $F^{13}$ returns the member $F^7$ and valve F the spring $F^2$ is released, so that the pressure in the vessel is strong enough to move the pressure-reducing valve off its seat. When this has happened, the member $F^7$ has cleared the end of the valve-spindle I, and the reduction of the pressure permits the spring I' to open the outlet-valve.

Instead of the valve $G^3$ being pushed off its seat by the pressure of the liquid on the head of the spindle or in addition to that pressure the end of the rotatable member may be caused to bear against the end of the valve-stem as the said member slides longitudinally.

Instead of the cam-surface $C^{16}$ and recess $C^7$ being formed on the casing they may be formed on the handle $F^{14}$ of the spindle $F^{11}$, the pin $F^{15}$ being carried on the casing, and instead of forming a screw-thread on the rotatable member to engage with a corresponding thread on the casing we may form a cam-groove on either of its parts to receive a pin or projection on the other part.

A convenient addition to the receptacle C is an indicator to show the pressure in the receptacle. This indicator conveniently comprises: A tubular extension or chamber J mounted on the top of the receptacle C, (see Fig. 13,) and in this chamber is disposed a piston J', having an upwardly-extending rod $J^2$, which passes through the top of the chamber and carries an index-finger $J^3$, adapted to travel in front of a scale $J^4$. The piston is pressed normally downward by a spring $J^5$, so as to retain the finger at the zero of the scale; but when the pressure in the aerating-receptacle reaches a predetermined limit the piston is forced upward against the action of the spring and the pressure in the receptacle is indicated upon the scale.

Figure 14:
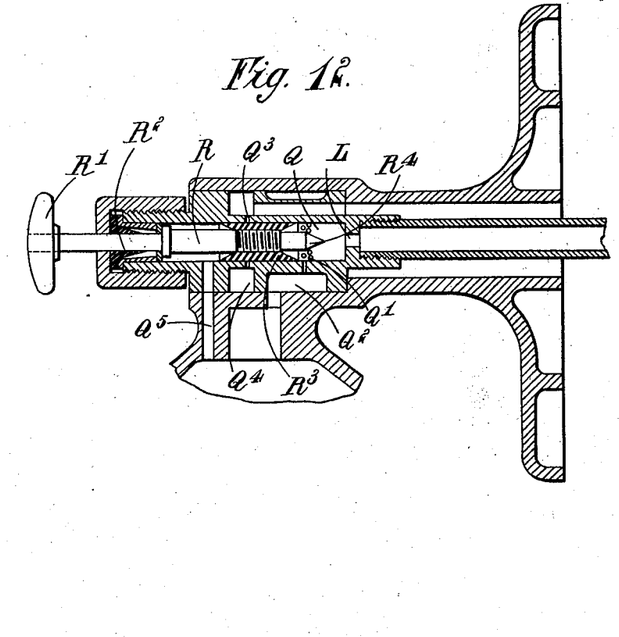
Figure 15:
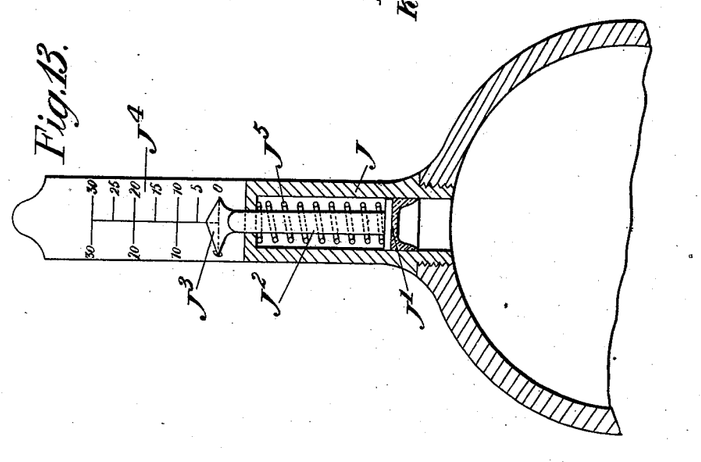

The pressure of the gas or liquid may be reduced before they enter the aerating-chamber by means of the pressure-reducing device K, (see Fig. 14,) which is connected to the pipes supplying the liquid and gas. The liquid or gas enters the device through opening K', which leads into the chamber $K^2$, the outlet of which is situated in a diaphragm $K^3$ and is normally closed by a valve $K^4$. The rod $K^5$ of the valve $K^4$ is connected to a piston $K^6$, moving in a chamber $K^7$ on the side of the diaphragm remote from the inlet-opening K', in which is the outlet $K^8$ of the device. The curved or convex side $K^9$ of the piston bears against the rubber diaphragm $K^{10}$, upon the upper side of which a curved or convex disk $K^{11}$ is pressed by a spring $K^{12}$. The power of the spring can be regulated by turning the adjusting-screw $K^{13}$, which may be provided with a lock-nut $K^{14}$ to retain it in its adjusted position. Normally the valve is kept open, so that the liquid or gas can pass through the device; but when a predetermined pressure is exceeded the piston is forced upward and closes the valve.

In place of a rotary action to effect the opening and closing of the supply-valve the operating-spindle may be arranged to have an axial or longitudinal movement, such as would result from pressing on a button carried on the end of a spindle. In this arrangement the axial movement may impart the necessary movement to the rotatable member by rack-and-pinion or worm gear, or a system of levers may be used, whereby the valve when the end of the spindle is pressed will be directly lifted off its seat.

Any convenient form of mixing device of the nature of a fan, paddle, conveyer-worm or other type of mechanism may be utilized to assist in effecting an intimate mingling of the gas and liquid as they enter the receptacle.

In some cases in order to insure proper aeration of the water the receptacle may be so arranged on bearings that it may be rotated about the axis of the operating-spindle or otherwise, so as to shake up the contents. Preferably, however, satisfactory aeration is accomplished by insuring the presence of suitable pressure in the aerating-chamber.

In place of being normally empty the apparatus may be arranged so that the aerating-chamber is normally filled with liquid, which will be discharged by operating the handle or push-piece. In this case the screw-thread $F^9$ on the rotatable member is right-handed instead of left-handed, and the conical valve F is so arranged that it is normally off its seat, but is forced onto its seat by the manipulation of the operating-handle. The cam part of the rotatable member $F^7$, controlling the movement of the outlet-valve $I^2$, is also modified. The automatic device whereby the operating-handle $F^{14}$ is returned to its normal position consists, preferably, with this modification in arranging the mechanism so that after each manipulation the pin or stud $F^{15}$ on the handle will be disengaged from its recess, so that the handle may be returned to its normal position and the valve F lifted off its seat. This will effect the closing of the outlet-valve $I^2$, and since the valve F is open the aerating-chamber will be filled with liquid and gas and the liquid aerated in readiness to be withdrawn.

Figure 7:
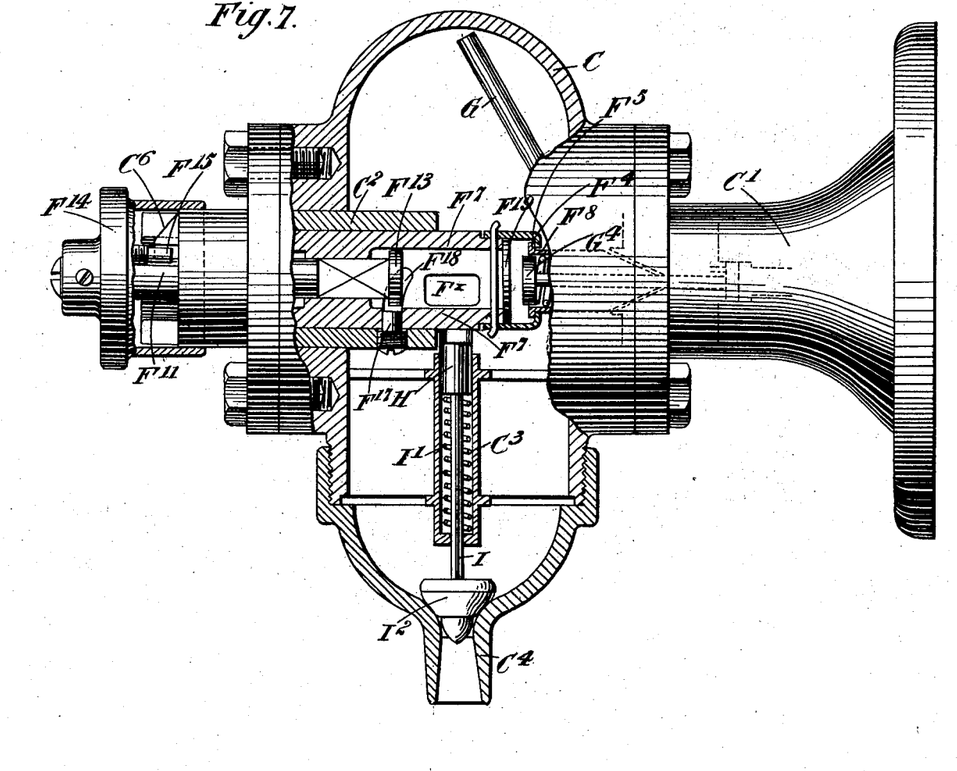
Fig. 7 is a sectional elevation of a modified construction in which the chamber is normally filled with aerated liquid.
Figures 8, 9, 10:
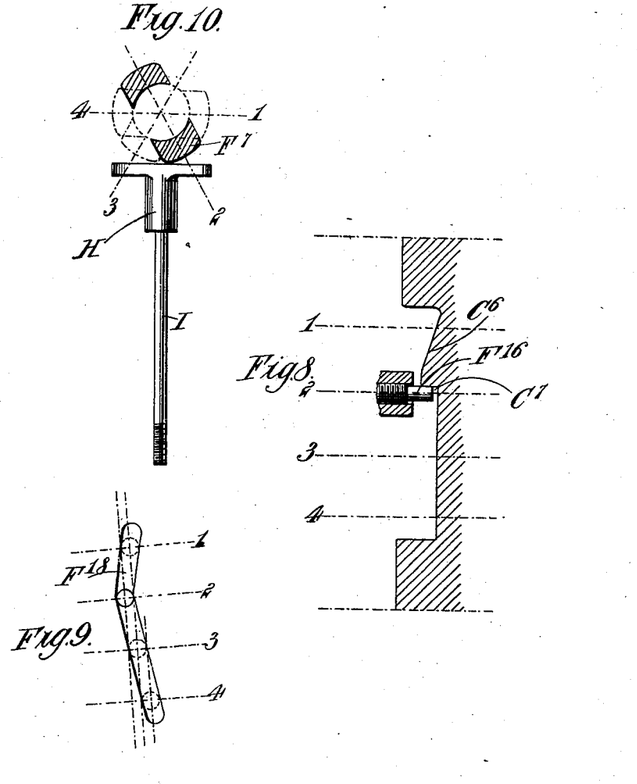
Figs. 8, 9, and 10 are details of the valve-operating mechanism.

Another modified construction of the apparatus normally filled with aerated liquid is illustrated in Figs. 7 to 10. In this case the screw-thread on the rotary member is replaced by a cam-groove $F^{18}$, into which enters a pin or projection $F^{17}$ on the casing of the receptacle. A developed view of the cam $C^6$ for coöperating with the pin $F^{15}$ of the cap $F^{14}$ is shown in Fig. 8, a similar view of the cam-groove $F^{18}$ in Fig. 9, and the positions of the rotatable member $F^7$ during a complete cycle of operations are shown in Fig. 10, the positions marked 1, 2, 3, and 4 in these figures denoting the positions of the different parts at the same time. In the normal or general condition of this apparatus the receptacle being filled the inlet-orifices are closed by the valve F and the pressure-reducing valve is also shut while the discharge-valve is kept against its seat by the pressure of the aerated liquid in the chamber. When it is desired to deliver the aerated liquid from the receptacle, the head $F^{14}$ is rotated through a sixth of a revolution, and in passing from the position 1 to the position 2 (see Fig. 8) the pin $F^{15}$ runs up the face of the cam $C^6$, causing the spindle to move axially outward, and then enters the recess $C^7$. The member $F^7$ rotates with the spindle and also slides longitudinally under the action of the pin $F^{17}$ in the groove $F^{18}$ into the position 2. (See Fig. 9.) In this position the inlet-valve F is raised off its seat, so that the inlet-orifices are opened, and the pressure-reducing valve remains closed, while the discharge-valve is kept closed by the cam part of the member $F^7$. The opening of the inlet-orifices is only momentary, as they are again closed when the pin enters the recess as the rotation of the spindle is continued, and as the chamber is already full and the outlet-valve closed no liquid or gas enter the chamber. By the continued rotation of the spindle through another sixth of a revolution the parts travel from position 2 to the position 3, (see Figs. 8, 9, 10,) in which position the inlet-orifices, the pressure-reducing valve, and the discharge-valve are all shut and the rotatable member has moved longitudinally in the opposite direction to its previous movement under the influence of the pin $F^{17}$, moving in the groove $F^{18}$, and the collar or head $F^{19}$ within the member $F^7$ comes into contact with the head $G^4$ on the spindle of the valve $G^3$. After a further rotation of the spindle through another sixth of a revolution the parts reach the position 4, in which the opening still remains closed, and the rotatable member $F^7$ is moved out of engagement with the end of the spindle I. Meanwhile the collar $F^{19}$ has pushed the valve $G^3$ off its seat, allowing the excess gas in the receptacle to escape this reduction in pressure, causing the valve $I^2$ to open under the action of the spring $I'$, so that the aerated liquid is delivered. On releasing the handle $F^{14}$ the spindle and rotatable member rotate in a reverse direction under the action of the spring $F^{16}$ to the position 2, Fig. 8, in which position the outlet and pressure reducing-valves $I^2$ $G^3$ are closed and the inlet-valve F opened to allow a fresh supply of gas and liquid to enter the receptacle. When the chamber is filled, the pressure therein causes the spindle to slide longitudinally in a manner already described, so as to free the pin from the recess $C^7$ and allow the spindle to return to its normal position 1.

By operating the valves or cocks $B^2$ of the pipes leading from the liquid-reservoirs the liquid in any of these reservoirs can be admitted to the chamber $B^3$, and thence to the aerating-chamber, or by shutting off all these cocks water alone may be allowed to enter the aerating-chamber and to be aerated and withdrawn as desired.

Water or other liquid to be aerated may be subjected to the operation of a jet of the gas employed where working merely so as to spray or atomize the liquid or mix it with the gas or also serving to suck the liquid, so as to introduce it into the apparatus. In one form of the apparatus hereinafter described the liquid is supposed to be supplied from some suitable source, which in the case of the water may be the house-main. If the latter is used, the water will be under pressure, but, as above mentioned, the jet may operate as an injector and suck the liquid even from a lower level. A non-return valve is provided, and where pressure has to be made the valve may be controlled by one or more springs the tension of which can be adjusted, preferably, externally, so that where necessary any excess of pressure of the liquid may be compensated. The water-supply leads to a jet-nozzle one member of which introduces the carbonic-acid or other gas, which may come from one of the usual gas-bottles or other suitable source of supply. The supplies of both gas and water may be controlled by suitable taps and valves, as required.

Figure 11:
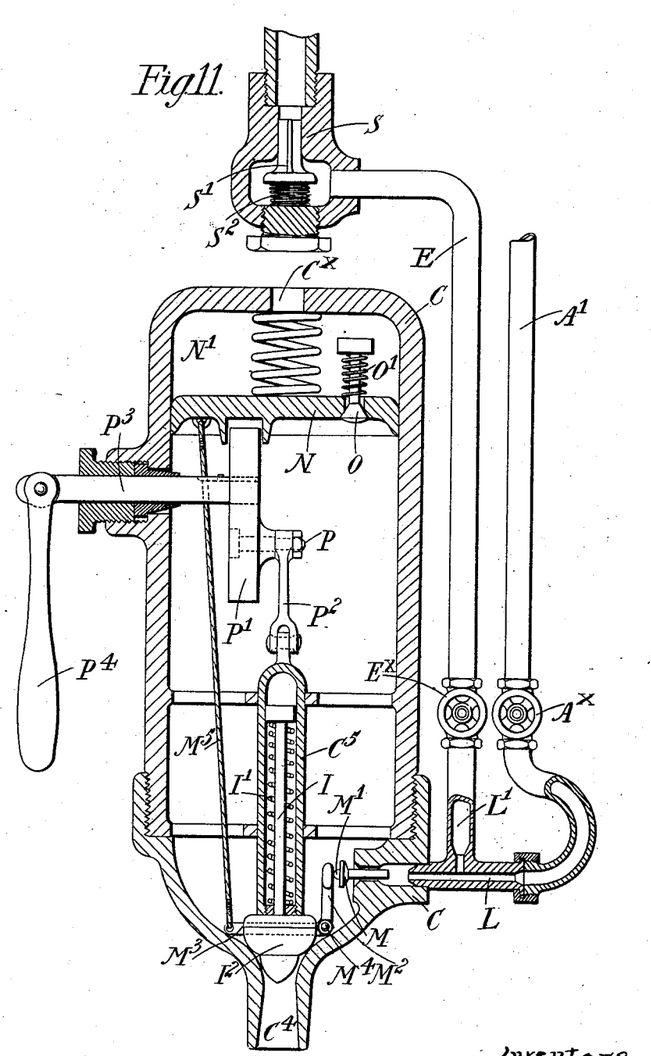
Fig. 11 is a sectional elevation of another modified arrangement of valve-operating mechanism so arranged that the chamber is normally filled with aerated liquid.

In the constructions illustrated in Fig. 11 the receptacle is normally filled with aerated liquid and the water is supplied by the pipe E, which, as in the previous example, may be connected with the house-main. The water-pipe E leads to a jet-nozzle L through a member L', by which the carbonic-acid or other gas is introduced by the pipe A', the supply of both gas and liquid being regulated as required by taps or cocks $E^\times$ and $A^\times$. The entrance to the aerating-chamber in which the jet-nozzle is disposed is provided with a valve-seating, on which is seated a non-return valve M. The gas and liquid entering the receptacle push the valve M from its seat and the liquid and gas compress the air already within the chamber, so that it raises the piston N until the latter is stopped by the pressure of the spring N'. When the valve M is pushed off its seat by the inrush of the liquid and gas, the head M' of the valve bears against an arm $M^2$ of a bell-crank lever $M^3$, fulcrumed at $M^4$ and connected through the flexible cord $M^5$ with the piston N. The non-return valve O in the piston N is controlled by the spring O', and is so adapted that when the piston moves upward a sufficient distance, the head of the valve O comes into contact with the end of the chamber, and in being pressed downward opens and allows the excess of gas in the receptacle to escape to the atmosphere through the opening $C^\times$. The rod I of the outlet-valve $I^2$ is guided in a tube $C^5$, which in this case is movable longitudinally, being connected to the crank-pin P on the cam P' by a rod $P^2$. The spindle $P^3$, connected to the cam, is operated from the outside of the receptacle by the handle $P^4$. After the gas and liquid have entered the receptacle through the valve M and the piston has been raised the apparatus may stand in this condition full of aerated liquid for a considerable time. When it is desired to draw off the aerated liquid, the operator turns the handle $P^4$, thereby moving the cam so as to raise the piston and through the flexible connection $M^5$ the bell-crank lever $M^3$, so that the latter forces the non-return valve M onto its seat. The upward movement of the piston causes the valve O to open and permit the gas to escape to the atmosphere through an opening $C^\times$. When the cam is turned, the rod $P^2$ lifts the tube $C^5$, and when the spring I' is compressed the valve $I^2$ is opened and permits the aerated liquid to pass from the receptacle through the outlet-opening $C^4$. Upon the continued turning of the cam the outlet-valve $I^2$ is closed and the piston N resumes its normal position, thereby closing the valve O and opening the inlet-valve M.

$E^\times$ $A^\times$ are cocks upon the water and gas supply pipes. The water-supply pipe is provided with a pressure-regulator S, in a chamber in which is disposed a valve S', controlled by a spring $S^2$, which in the case of the pressure being too small tends to close the valve and when the pressure is too great tends to open it.

It will be appreciated that other devices may be employed for the cam, pawl, crank, and valve-operating mechanism without departing from the spirit of this invention.

In the modified form shown in Fig. 12, which is so arranged that the chamber is normally filled, the jet-nozzle L is employed and a non-return valve for the water or other liquid, as shown in Fig. 11. The jet is delivered into a conduit terminating in a chamber $q$, having perforations or valve-holes Q', communicating with an intermediate chamber $Q^2$, through which the receiver is charged. The valve-chamber is provided with a reciprocating valve R, having a piston $R^3$, by which the holes can be closed and the spindle of the valve can be pressed forward and operate like an ordinary needle-valve to stop the admission of gas and water. The stem $R^2$ of the valve projects through a stuffing-gland to the outside, where the operator can move it by a suitable head or knob R'. The other perforations $Q^3$ are formed in the walls of the chamber and communicate with a passage $Q^4$, that is open to the atmosphere, and, through a conduit $Q^5$, with the interior of the aerating-chamber. The fluid-receiver or aerating-chamber is provided with an outlet-nozzle and outlet-valve as before, the valve-stem having at its upper end a piston and a spring compressed between them and the end of the tube in which it lies and serving to maintain the foot-valve normally open.

The above-described apparatus may have the valve-operating mechanism so contrived that the chamber is normally empty. The pressure of the liquid acting on the piston $R^3$ of the valve normally keeps it in a position to close the perforations $Q^3$; but when the operator desires to draw a charge he pushes the knob R' inward, thereby cutting off the supply of gas and fluid and at the same time moves the reciprocating valve so that the piston $R^3$ closes the holes Q' in the chamber and also uncovers the holes $Q^3$, by which the interior of the receiver is placed in communication with the atmosphere and the gas is allowed to escape. At the same time the end $R^4$ of the spindle acts to close the inlet-orifice. The escape of the gas relieves the pressure upon the piston, whereupon the spring opens the foot-valve and the liquid escapes into the glass or bottle placed to receive it in a similar manner to the arrangement described with reference to Figs. 3 and 7. This apparatus may conveniently take the form of a curved standard or arm, which can be secured to a counter, table, &c., and through which the supply-pipes may be led, the outer end of the arm from which the receiver or aerating-chamber depends in a convenient manner, or the receiver may form part of or be contained in the standard.

Although we have hitherto spoken of the aerating-chamber C as being vertical and the outlet-valves $I^2$ reciprocating in a vertical plane, we wish it to be understood that we are not obliged to adopt that position and can arrange these parts to act in a horizontal or other plane, if desired. To increase the effect of the gas upon the liquid, a fan or other mixing device, operated either by the jet itself or by any other means, may be employed, if desired, so that the liquid and gas are caused to mix intimately before the liquid is withdrawn from the chamber C.

Instead of using the spray or inlet orifices shown with reference to Figs. 3 and 7 or atomizing-nozzle, as shown in Figs. 11 and 12, by which the fluid to be aerated is conveyed into the receiver C through the same orifice as the gas, we may employ two orifices independent of each other, the fluid flowing through one and the gas through the other, the mixing or aeration to take place within the receiver.

What we claim as our invention, and desire to secure by Letters Patent, is—

1. In an apparatus for aerating liquids, the combination with a chamber into which gas and liquid are admitted from separate sources, the liquid being aerated in the chamber and delivered therefrom after reduction of pressure, of controlling mechanism, means for imparting initial movement manually to the mechanism, and means whereby the ultimate pressure in the chamber automatically acts subsequently on the mechanism to control the admission of gas and liquid to the chamber, the reduction of pressure and the discharge from the chamber of the aerated product.

2. In apparatus for aerating liquids, the combination with a chamber in which gas and liquid are admitted from separate sources, the liquid being aerated in the chamber and delivered therefrom after reduction of the pressure, of mechanism controlling the separate supplies of gas and liquid, reduction of the pressure and the discharge of the aerated product, means for actuating the controlling mechanism mechanically and means by which the ultimate pressure in the chamber automatically acts on the controlling mechanism, substantially in the manner and for the purpose described.

3. In apparatus for aerating liquids, the combination with a chamber into which gas and liquid are admitted from separate sources, the liquid being aerated in the chamber and delivered therefrom after reduction of pressure, of valve-controlling mechanism, means whereby the ultimate pressure in the chamber automatically acts on the controlling mechanism to effect the cutting off of the supplies of gas and liquid and the opening of a discharge-outlet for the aerated product.

4. In apparatus for aerating liquids, the combination with a chamber into which gas and liquid are admitted from separate sources, the liquid being aerated in the chamber and delivered therefrom after reduction of pressure, of valve-controlling mechanism, and means whereby the ultimate pressure in the chamber automatically acts on the controlling mechanism to cut off the supplies of gas and liquid and open the pressure-reducing valve and a discharge-outlet for the aerated product.

5. In apparatus for aerating liquids, the combination with a chamber having inlet-openings communicating with separate supplies of gas and liquids, of an inlet-controlling valve, a pressure-reducing valve, a discharge-valve, and a valve-controlling device which only requires to receive a single movement by the operator to admit gas and liquid to the chamber, the ultimate pressure in which automatically causes the controlling device to cut off the supply of gas and liquid and also causes the pressure-reducing valve and the discharge-valve to be successively opened and the aerated liquid delivered.

6. In apparatus for aerating liquids, the combination with a chamber into which are admitted liquid and gas simultaneously and from separate sources, the liquid being aerated in the chamber and delivered therefrom after reduction of pressure, of valve-controlling mechanism, and means whereby the ultimate pressure in the aerating-chamber automatically acts on the controlling mechanism to cut off the supplies of gas and liquid, open the pressure-reducing valve and a discharge-outlet for the aerated product.

7. In apparatus for aerating liquids, the combination with a chamber, of a pressure-reducing valve, a discharge-valve, a plurality of conduits communicating with separate supplies of gas and liquid, a valve controlling all the inlet-conduits, and a spindle connected with these valves and actuated initially by hand and subsequently automatically by the ultimate pressure in the chamber, substantially as described.

8. In apparatus for aerating liquids, the combination with a chamber, of a plurality of conduits communicating with separate supplies of gas and liquids, a valve controlling all the conduits, a spring-controlled pressure-reducing valve, a spring-controlled discharge-valve, a hand-operated device operatively connected with the aforesaid valves and means whereby the ultimate pressure in the chamber automatically acts on the hand-operated device substantially as described.

9. In apparatus for aerating liquids, the combination with a chamber having a plurality of conduits communicating with separate supplies of gas and liquids, of a valve controlling all the conduits, a pressure-reducing valve adapted to be closed mechanically and opened by the resultant pressure in the chamber, a discharge-valve adapted to be closed mechanically, held closed by the resultant pressure in the chamber and opened by a spring and means for controlling these valves.

10. In apparatus for aerating liquids, the combination with a chamber normally empty, of a plurality of conduits communicating with separate supplies of gas and liquids, a valve-controlling mechanism comprising a spindle and a rotatable member adapted to rotate together and move axially independent of each other, a valve operatively connected with the controlling mechanism and adapted on the initial movement of the controlling mechanism to simultaneously put all the conduits in communication with the receptacle, a discharge-valve which is closed by the rotatable member on the initial movement of the controlling mechanism against the action of a spring and remains closed under the pressure in the chamber, a pressure-reducing valve closed by a spring which holds the inlet-valve on its seat and adapted to be opened by the pressure in the chamber, means for rotating the spindle, means for moving the spindle and rotatable member axially, a flange on the spindle on which the pressure in the chamber acts to move the spindle axially outward to allow it to return to its normal position under the action of a spring to open the outlet-valve and close the inlet-valve, substantially as described.

11. In apparatus for aerating liquids, the combination with a chamber, of a plurality of conduits communicating with separate sources of gas and liquid supplies, a valve controlling all the conduits simultaneously, a rotatable hollow member adapted to move the conduit-controlling valve off its seat, a spindle for rotating the hollow member, each being capable of independent axial movement, a spring-controlled pressure-reducing valve, means for operating the pressure-reducing valve, a spring-controlled discharge-valve adapted to be closed by the rotatable member and means for controlling the rotary and axial movement of the aforesaid spindle.

12. In apparatus for aerating liquids, the combination with a chamber, of a plurality of conduits communicating with separate sources of gas and liquid supplies, a valve controlling all the conduits simultaneously, a rotatable hollow member adapted to move the conduit-controlling valve off its seat, a spindle for rotating the hollow member each being capable of independent axial movement, a spring-controlled pressure-reducing valve adapted to be opened by the resultant pressure in the chamber, a spring-controlled discharge-valve adapted to be closed by the rotatable member, and means for controlling the rotary and axial movement of the aforesaid spindle and rotatable member.

13. In apparatus for aerating liquids, the combination with a chamber, of a plurality of coaxial conduits, a valve controlling all the conduits, a hollow member adapted to rotate on the valve and move it from its seat, a spindle rotatably connected to the hollow member between which and the spindle is a certain amount of independent longitudinal movement, means for moving the rotatable member axially, and means for moving the spindle axially outward, a pressure-reducing valve, means for operating it, a discharge-valve and means for operating it.

14. In apparatus for aerating liquids, the combination with a chamber having a plurality of inlet-conduits communicating with separate sources of gas and liquid supply, and a valve controlling all the conduits, of a pipe communicating with the interior of the receptacle, and a pressure-reducing chamber, of a valve closing the outlets of the pressure-reducing chamber, a spring tending to retain the pressure-reducing valve on its seat, a head on the valve-stem on which the resultant pressure in the chamber acts to open the pressure-reducing valve, a discharge-valve, and means for successively operating these valves.

15. In apparatus for aerating liquids, the combination with a chamber having a plurality of inlet-conduits communicating with separate sources of gas and liquid supply, and a valve controlling all the conduits, a pressure-reducing chamber communicating with the chamber and the atmosphere, a valve controlling the outlet of the pressure-reducing chamber, and means for operating this valve, of a discharge-valve having a stem and a piston sliding in a guide-tube, a spring tending to lift the discharge-valve from its seat, the discharge-valve being adapted to be closed by means for operating the conduit-valve and to be held closed by the pressure of liquid and gas in the chamber.

16. In apparatus for aerating liquids, the combination with a chamber having a plurality of gas and liquid inlets, of a valve adapted to simultaneously control these inlets, a rotatable member on the valve, a screw-thread on the rotatable member, a coöperating screw-thread on the casing, a spindle rotating with the rotary member, and capable of longitudinal movement therein, a head on the spindle, a projection on the head, a cam on the casing with which the projection engages, a spring for returning the spindle and the parts operatively connected therewith to their normal position, a pressure-reducing valve, and a discharge-valve substantially as and for the purpose set forth.

17. In apparatus for aerating liquids, the combination with the aerating-chamber, the gas and liquid conduits, the valve controlling them, and the rotatable member and spindle of a pressure-reducing valve, a stem on said valve located within the conduit-controlling valve, a head on the stem, a spring disposed between the said head and the valve, a discharge-valve so disposed that the pressure in the chamber tends to hold it closed, a rod on said valve, a head on the rod by which the rotatable member closes the valve, and a spring tending to open the discharge-valve, substantially as described.

18. In apparatus for aerating liquids, the combination with an aerating-chamber, of a hollow support, a series of disks placed side by side in the support and having a peripheral annular flange projecting in one direction, and a hollow central hub projecting in the opposite direction, pipes connecting the chambers, formed by these disks with separate supplies of liquid and gas, an outlet-orifice formed by the central hub of each chamber and opening into the aerating-chamber, a valve controlling all the outlet-orifices, a pressure-reducing valve, a discharge-valve, and a controlling device for successively operating these valves, substantially as described and shown.

19. In apparatus for aerating liquids, the combination with an aerating-chamber, of a hollow support, a series of disks placed side by side in the support and having a peripheral annular flange projecting in one direction and a hollow central hub projecting in the opposite direction, pipes connecting the chambers formed by these disks with separate supplies of liquid and gas, an outlet-orifice formed by the central hub of each chamber and opening into the aerating-chamber, a valve controlling all the outlet-orifices, a pressure-reducing valve, a valve normally closing the outlet, of a pressure-reducing chamber arranged coaxially with the aforesaid chamber, a pipe by which the pressure-reducing chamber communicates with the aerating-chamber, a discharge-valve and a controlling device operatively connected to the inlet, pressure-reducing and discharge valves, substantially as described.

20. In apparatus for aerating liquids, the combination with a chamber into which gas and liquid are admitted from separate sources the liquid being aerated in the chamber and delivered therefrom after reduction of the pressure, of valve-controlling mechanism, means for operating the controlling mechanism manually, means whereby the ultimate pressure in the chamber automatically acts on the controlling mechanism, to cut off the supplies of gas and liquid and to open a discharge-outlet for the aerated liquid and a device for indicating the pressure within the aerating-chamber substantially as described.

21. In apparatus for aerating liquids, the combination with a chamber into which gas and liquid are admitted from separate sources, the liquid being aerated in the chamber and delivered therefrom after reduction of the pressure, of valve-controlling mechanism, means for operating the controlling mechanism manually, means whereby the ultimate pressure in the chamber automatically acts on the controlling mechanism to cut off the supplies of gas and liquid and to open a discharge-outlet for the aerated liquid, a pressure-reducing device, and a device for indicating the pressure within the aerating-chamber substantially as described.

In testimony whereof we have signed our names to this specification in the presence of two subscribing witnesses.

FRANK GEORGE HAMPSON.
HARRY SWALES.

Witnesses:
A. McKENZIE,
WALTER J. SKERTEN.